United States Patent [19]
McNamara

[11] Patent Number: 6,120,064
[45] Date of Patent: Sep. 19, 2000

[54] AIR HOSE COUPLER WITH EXTENDED GRIP

[76] Inventor: Howard L. McNamara, 8417 Pinecone Dr., Lakeland, Fla. 33809

[21] Appl. No.: 09/244,220

[22] Filed: Feb. 4, 1999

[51] Int. Cl.[7] ............................................. F16L 35/00
[52] U.S. Cl. ................................ 285/38; 285/75; 285/67
[58] Field of Search .................................. 285/38, 65, 66, 285/67, 68, 69, 70, 71, 72, 73, 74, 75, 76, 77, 78, 79

[56] References Cited

U.S. PATENT DOCUMENTS

| | | | |
|---|---|---|---|
| 731,379 | 6/1903 | Martin | 285/74 |
| 1,330,983 | 2/1920 | Longo | 285/38 |
| 3,874,696 | 4/1975 | Gardner et al. . | |
| 4,226,103 | 10/1980 | Strickland . | |
| 4,325,237 | 4/1982 | Menzie . | |
| 4,550,928 | 11/1985 | Berg | 285/75 |
| 4,634,151 | 1/1987 | Holt | 285/38 |
| 4,693,096 | 9/1987 | Mercer . | |
| 4,732,018 | 3/1988 | Crosby . | |
| 4,738,126 | 4/1988 | Haberle . | |
| 5,129,243 | 7/1992 | Kassebaum . | |
| 5,240,311 | 8/1993 | Bunker . | |
| 5,251,666 | 10/1993 | Kimball et al. | 285/67 |
| 5,675,997 | 10/1997 | Hulak . | |
| 5,683,148 | 11/1997 | Li et al. . | |

Primary Examiner—Lynne H. Browne
Assistant Examiner—Aaron Dunwoody
Attorney, Agent, or Firm—Thomas, Kayden, Horstemeyer & Risley

[57] ABSTRACT

An air hose coupler for use in a tractor-trailer air brake system incorporates a body with a first air passage formed therethrough and a first mating face. The first mating face includes a first air orifice which communicates with the first air passage. A grip member is attached to the body and, in preferred embodiments, extends radially outwardly therefrom. The grip member includes a proximal end and a distal end, and a second air passage formed through the grip member from the proximal end to the distal end, with the second air passage pneumatically communicating with the first air passage. Additionally, the distal end incorporates a tapered neck and is adapted to communicate with an air hose such that the air hose pneumatically communicates with the second air passage. So configured, the grip member is graspable by an operator during engagement of the air hose coupler to a trailer coupler, thereby

15 Claims, 5 Drawing Sheets

AIR HOSE COUPLER WITH EXTENDED GRIP

BACKGROUND OF THE INVENTION

1. Field of the Invention

The present invention relates to air hose couplers and, in particular, to an improved air hose coupler for use in a tractor-trailer air brake system.

2. Description of the Related Art

Typically, a tractor and its associated trailer incorporate an air brake system that is adapted to provide braking to the wheels of the trailer. Air pressure for the brake system generally is supplied by the tractor, with pressurized air being delivered to the brakes of the trailer through a series of air hoses. The brake system is configured so that when air pressure being supplied to the brakes of the trailer drops below a predetermined level, the brakes apply a braking force to the wheels of the trailer. So configured, a loss of air pressure being supplied by the tractor or a loss of air pressure in the air delivery system should cause the brakes of the trailer to engage, thereby assisting in slowing or stopping the trailer.

Since tractors typically must engage, operate with, and then disengage various trailers, prior art tractor-trailer air brake systems are configured so that the tractors can mateably engage with, and then selectively disengage from various trailers. As is well known in the prior art, connection of the air brake system of a tractor to that of a trailer typically is accomplished by a mateably engagable pair of couplers. Generally, one coupler is attached to the rear of a trailer and is adapted to be engaged by a second coupler or glad hand, which is attached to a tractor.

Connection of couplers typically is facilitated by engaging mating faces of the couplers. Each mating face incorporates an orifice which communicates with an air passage formed through its coupler. At least one of the couplers typically is provided with a gasket so that the gasket is compressed between the mating faces of each coupler during mating, thereby forming an air tight seal between the couplers. Once the mating faces are engaged, the glad hand is rotated relative to the trailer coupler so that a locking plate or paw of the glad hand is engaged between catch plates or catches of the trailer coupler, thereby retaining the glad hand in an engaged position.

In order to manipulate a prior art glad hand into mating engagement with a trailer coupler, the operator of a tractor-trailer typically must grasp the glad hand, such as by its air hose and/or coupler housing. Due to the close proximity of the coupler housing of the glad hand to the engaging portions of the couplers, i.e. the paws and catches, injury to the operator's hands and fingers can result if the operator's hands or fingers slip between the engaging portions of the couplers during engagement. If, however, the operator grasps the air hose or air hose connector, the force applied by the operator in manipulating the glad hand can damage the air hose and/or the connection between the air hose and its air hose connector.

Therefore, there is a need to provide an improved air hose coupler which addresses these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an improved air hose coupler for use in a tractor-trailer air brake system and which is configured so that an operator typically is able to keep his hands and/or gloved hands from being pinched between portions of the coupler and its associated trailer coupler while attempting to engage or disengage the couplers. In a preferred embodiment, the air hose coupler incorporates a body with a first air passage formed therethrough and a first mating face. The first mating face includes a first air orifice which communicates with the first air passage. A grip member is attached to the body and, in preferred embodiments, extends radially outwardly therefrom. The grip member includes a proximal end and a distal end, and a second air passage formed through the grip member from the proximal end to the distal end, with the second air passage pneumatically communicating with the first air passage. Additionally, the distal end incorporates a tapered neck and is adapted to communicate with an air hose such that the air hose pneumatically communicates with the second air passage. In preferred embodiments, the grip member incorporates side walls, a top wall, and an underside that cooperate to form the tapered neck.

In accordance with another aspect of the present invention, the grip member incorporates a shoulder which is formed between the tapered neck and the proximal end, with the shoulder being configured as a widened portion of the grip member as compared to the neck. So configured the shoulder seats within the palm of an operator's hand, thereby facilitating a more secure grasp of the coupler when using an underhand grip (described in detail hereinafter).

In accordance with still another aspect of the present invention, the grip member incorporates a stop formed between the shoulder and the proximal end, with the stop configured as a widened portion of the grip member as compared to the shoulder. So configured, the side of an operator's hand can abut the stop when the operator utilizes an underhand grasp, thereby improving the operator's ability to rotate the coupler during the engagement process.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

Figure 1:
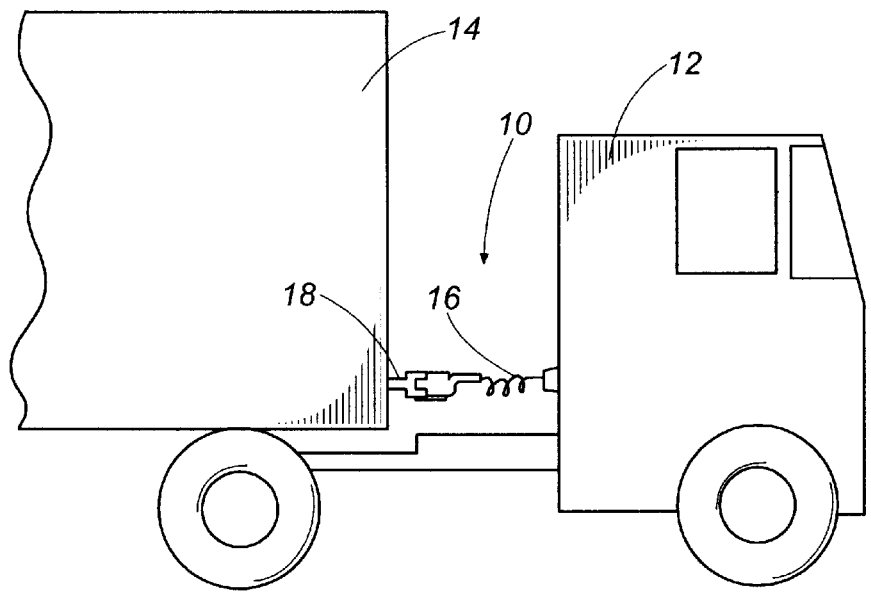
FIG. 1 is a partially cut-away side view of a representative tractor and trailer illustrating the operating environment of the present invention.

Reference will now be made in detail to the description of the invention as illustrated in the drawings, wherein like reference numbers indicate like parts throughout the several views. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Referring now to FIG. 1, the air hose coupler 10 of the present invention is shown attached to a representative tractor 12 and trailer 14. As discussed hereinabove, air hose coupler 10 facilitates pneumatic connection of a compressed air braking system, thus providing trailer 14 with braking when air pressure from the air braking system drops below a predetermined level. As conventionally known in the art, trailer 12 provides a supply of compressed air through the compressed air braking system, i.e., through air hose 16, air hose coupler 10, tractor coupler 18, and then through conventional brake lines (not shown) to the trailer brakes.

Figure 2:
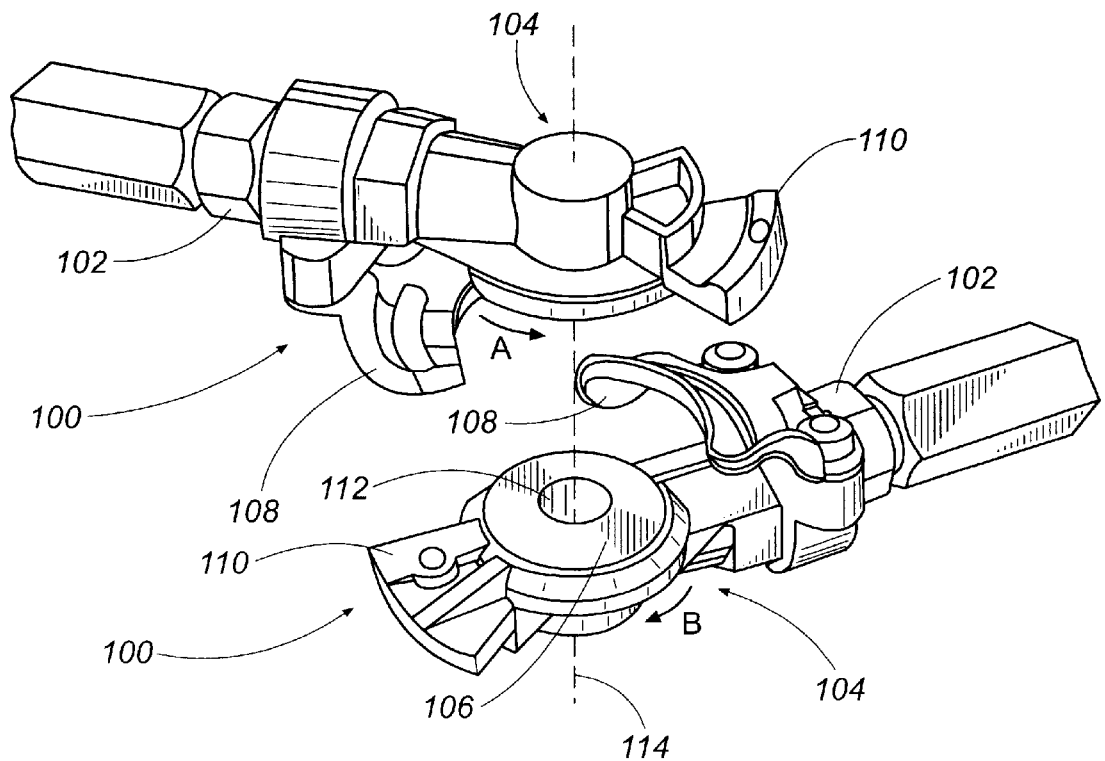
FIG. 2 is a perspective view of a pair of prior art air hose couplers.
Figure 3:
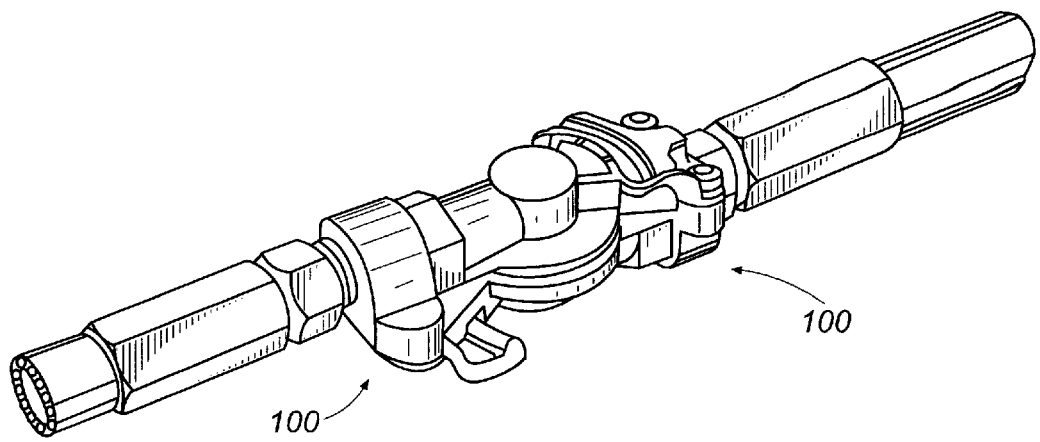
FIG. 3 is a perspective view of the prior art couplers of FIG. 2 showing the couplers in a mateably engaged position.

Referring now to FIGS. 2 and 3, a prior art pair of air hose couplers 100 are shown. Each coupler 100 incorporates an air hose connector or fitting 102 for cooperating with an air hose. Each fitting 102 is adapted to engage the body 104 of its coupler, thereby allowing the air hose to pneumatically communicate with the body 104. Each body 104 includes a mating face 106 (one of which is shown) and incorporates one or more mating members, such as a catch 108 and a paw 110. The catch 108 of each coupler 100 is configured to mateably engage with and retain the paw 110 of the other coupler. In order to pneumatically interconnect the couplers, the mating face 106 of the couplers are engaged so that the air passages 112 (one of which is shown) of the couplers align with each other. The couplers then are rotated about a longitudinal axis 114, e.g., in directions A and B, so that the paws 110 of each coupler engage the catches 108 of the other coupler (FIG. 3). So configured, the couplers form an air tight seal therebetween so that compressed air supplied by the tractor 12 can be supplied through the couplers 100 to the brakes of the trailer.

As discussed hereinbefore, manipulation of a prior art coupler 100 typically is facilitated by an operator grasping the body 104 of the coupler and/or its fitting 102. During engagement of the couplers and, in particular, as the mating faces 106 of the respective couplers are brought into engagement, it is not uncommon for the operator to be injured, such as by his hands and/or fingers impacting portions of the couplers, or possibly being pinched between the mating faces. Additionally, as the couplers 100 are rotated about longitudinal axis 114 so that paws 110 are engaged by catches 108, the operator's fingers also can be pinched between the paw of one of the couplers and the catch of the other coupler. These problems also can tend to allow protective equipment, such as gloves, to be snagged between the couplers.

Figure 4A:
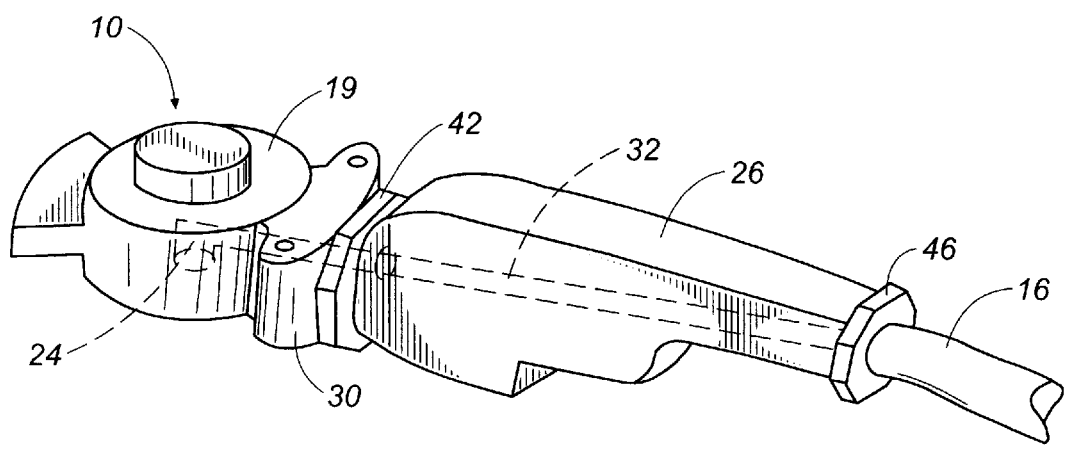
FIG. 4A is a perspective view of a preferred embodiment of the present invention.
Figure 4B:
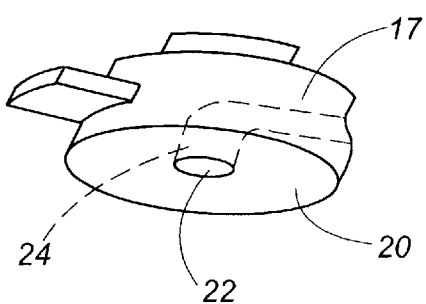
FIG. 4B is a partially cut-away, perspective view of the embodiment of FIG. 4A, showing detail of the air orifice.
Figure 5:
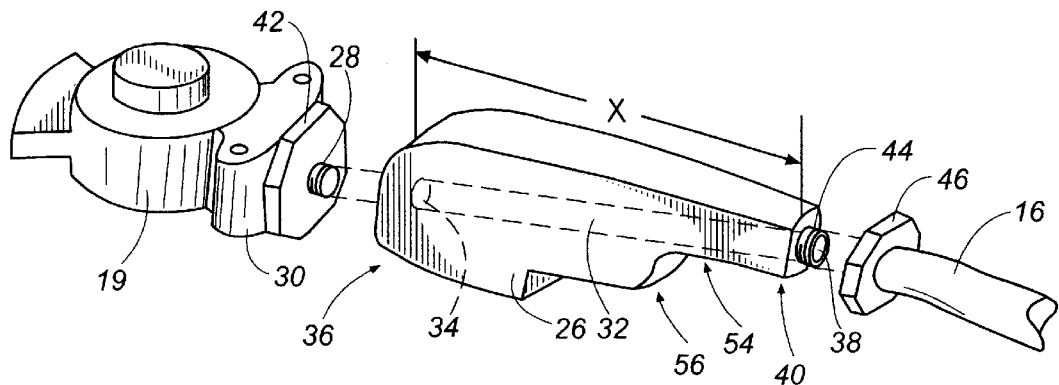
FIG. 5 is a partially exploded, perspective view of a preferred embodiment of the present invention.

As shown in FIGS. 4A, 4B and 5, the air hose coupler 10 of the present invention incorporates a body 19 which includes a mating face 20. Mating face 20 is configured to engage a corresponding mating face of a trailer coupler (described in detail hereinafter). Mating face 20 includes an air orifice 22 which pneumatically communicates with an air passage 24 formed through body 19 and which provides a passage for air to be delivered from tractor 12 (FIG. 1), through the body. Coupler 10 also incorporates an extended grip member or grip 26 which extends outwardly from body 19 and is attached to the body by an externally threaded fitting 28 which extends from side wall 30. Grip 26 includes an air passage 32 formed therethrough which communicates with orifice 34 at its proximal end 36 and with orifice 38 at its distal end 40. The grip is adapted to engage fitting 28, such as by internal threads formed within air passage 32 at proximal end 36. Additionally, a locking nut 42 preferably is provided with the fitting 28 and which is disposed between the body and the grip for securing the engagement of the grip to the body. Distal end 40 incorporates a fitting 44 extending therefrom and which houses orifice 38. Fitting 44 is adapted to engage an air hose connector 46 which cooperates with air hose 16 of tractor 12, thereby allowing air from the tractor to be delivered from air hose 16 through the coupler 10.

Figure 6:
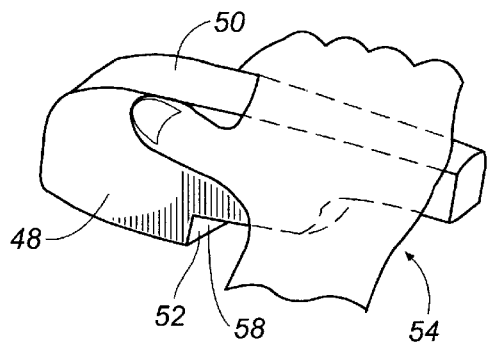
FIG. 6 is a perspective view of a preferred embodiment of the present invention with a representative hand showing a technique for grasping the extended grip.
Figure 7:
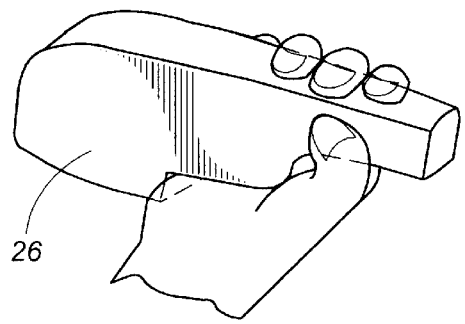
FIG. 7 is a perspective view of a preferred embodiment of the present invention with a representative hand showing an alternative technique for grasping the extended grip.

As shown in the preferred embodiment of FIG. 5, grip 26 extends a length (X) which is adapted to provide a suitable length about which an operator may conveniently grasp the grip while manipulating the coupler 10 (FIGS. 6 and 7). A length X of at least approximately four inches has been found to be suitable for typical applications. Grip 26 preferably is formed from machine cast allow steel and incorporates a pair of opposing side walls (side wall 48 is shown), a top wall 50, and an underside 52. At its distal end 40, the side walls, top wall and underside cooperate to form a tapered neck 54 which is sized and shaped so as to provide an operator with a location about which the operator's fingers may be placed, such as shown in FIG. 6. Additionally, intermediate its distal and proximal ends, the grip provides a widened shoulder 56, preferably formed by downwardly extended portions of the side walls. The shoulder is configured to comfortably seat within the palm of an operator's hand, thereby facilitating a more secure grasp of the coupler 10 when using an underhand grip (FIG. 7), for instance. Between shoulder 56 and proximal end 36, a stop 58 preferably is provided so that the side of an operator's hand abuts the stop when the operator utilizes an underhand grasp, thereby improving the operator's ability to rotate the coupler during the engagement process. So configured, the operator is able to keep his hands and/or gloves from being pinched between portions of the coupler and its associated trailer coupler while attempting to engage or disengage the couplers.

Figure 8:
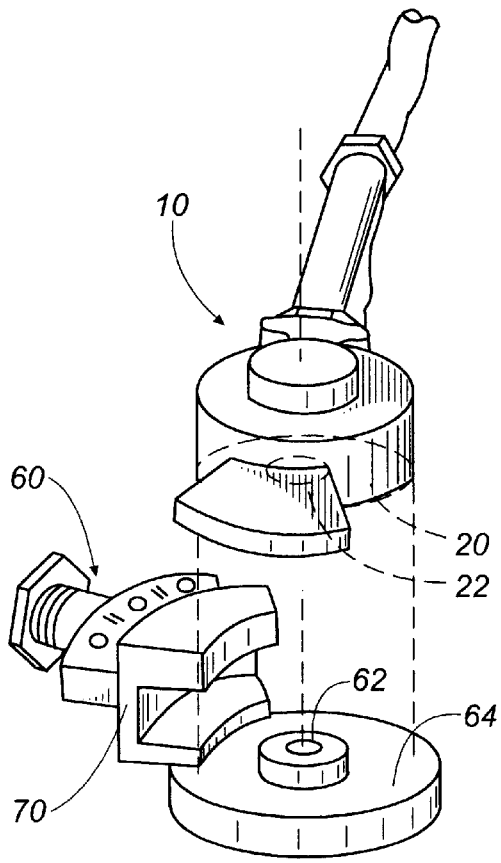
FIG. 8 is a perspective view of a preferred embodiment of the present invention with the glad hand coupler aligned for engagement with a trailer coupler.
Figure 9:
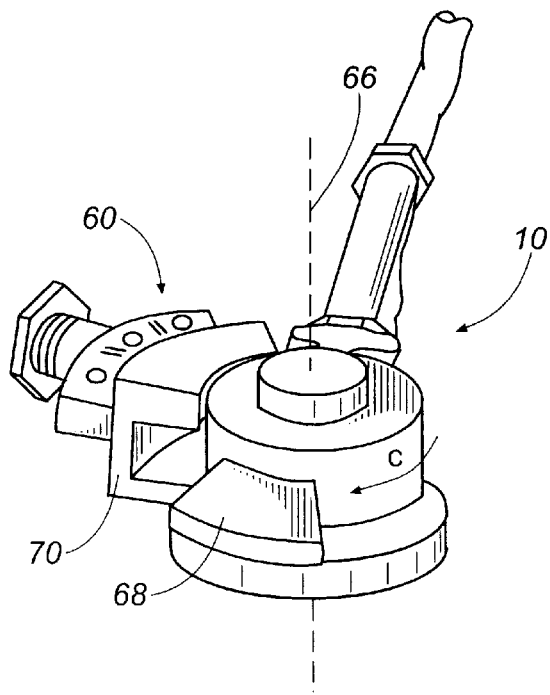
FIG. 9 is a perspective view of the embodiment of FIG. 8 with the glad hand coupler seated against the trailer coupler during engagement.
Figure 10:
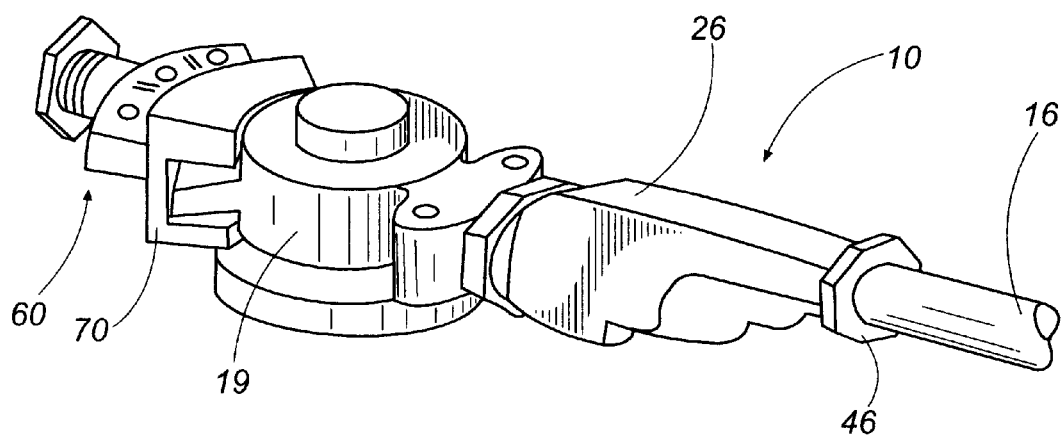
FIG. 10 is a perspective view of the embodiment of FIGS. 8 and 9 with the couplers in mating engagement with each other.

As shown in FIGS. 8, 9 and 10, mating engagement of coupler 10 to a trailer coupler 60 is accomplished by aligning air orifice 22 of the coupler with air orifice 62 of the trailer coupler. The couplers are then brought together so that mating face 20 of the coupler 10 engages mating face 64 of coupler 60. Coupler 10 is then rotated about axis 66 (in direction C) until paw 68 of coupler 10 seats within catch 70 of coupler 60 in an engaged position as shown in FIG. 10. Disengagement of the couplers is accomplished by reversing the aforementioned procedure.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

I claim:

1. An air hose coupler for use in a tractor-trailer air brake system, the air brake system having an air hose and a trailer coupler, said air hose coupler comprising:

a body having a first air passage formed therethrough, a first mating face, and a side wall, said first mating face having a first air orifice communicating with said first air passage, said side wall having a second fitting extending radially therefrom;

a grip member attached to said second fitting and extending radially outwardly therefrom, said grip member having a proximal end and a distal end, and a second air passage formed therethrough from said proximal end to said distal end, said second air passage pneumatically communicating with said first air passage, said distal end having a tapered neck adapted to communicate with an air hose such that the air hose pneumatically communicates with said second air passage, said grip member being graspable by an operator during engagement of said air hose coupler to a trailer coupler.

2. The air hose coupler of claim 1, wherein said grip member has side walls, a top wall, and an underside, said side walls, said top wall, and said underside cooperating to form said tapered neck.

3. The air hose coupler of claim 1, wherein said grip member has a shoulder formed between said tapered neck and said proximal end, said shoulder configured as a widened portion of said grip member as compared to said neck.

4. The air hose coupler of claim 1, wherein said grip member has a first fitting extending outwardly from said distal end, said first fitting being adapted to engage the air hose such that the air hose pneumatically communicates with said second air passage.

5. The air hose coupler of claim 3, wherein said grip member has a stop formed between said shoulder and said proximal end, said stop configured as a widened portion of said grip member as compared to said shoulder.

6. The air hose coupler of claim 4 wherein said grip member has a length from said proximal end to said distal end of at least approximately 4 inches.

7. The air hose coupler of claim 5, wherein said body has a paw extending therefrom and the trailer has a catch for receiving said paw.

8. An air hose coupler for use in a tractor-trailer air brake system, the air brake system having a trailer air hose and a trailer air hose coupler and a tractor air hose and a tractor air hose coupler, said tractor coupler comprising:

a body having a first air passage formed therethrough and a first mating face for mating with a trailer air hose coupler, said first mating face having a first air orifice extending therethrough and communicating with said first air passage;

an elongated grip member having a proximal end rigidly attached to said body and a distal end projecting approximately parallel to and away from said mating face, a first fitting extending outwardly from said distal end of said grip, and a second air passage formed through said first fitting, through said proximal end and through said distal end, and to said second air passage and pneumatically communicating with said first air passage of said body, said first fitting being adapted to engage an air hose such that the air hose pneumatically communicates with said second air passage, said grip having a neck of progressively stepped reduced breadth from said proximal end toward said distal end and being graspable by an operator during engagement of said air hose coupler to a trailer coupler;

so that the shape of the grip retards the inadvertent sliding of an operator's hand from said distal end toward the proximal end of the grip.

9. The air hose coupler of claim 8 wherein said body has a side wall and a second fitting extending radially therefrom, and said grip member is attached to said second fitting.

10. The air hose coupler of claim 8, wherein said grip member has side walls, a top wall, and an underside, said side walls, said top wall, and said underside cooperating to form said progressive stepped neck.

11. The air hose coupler of claim 8, wherein said grip member has a shoulder formed between said distal end and said proximal end configured as a widened portion of said grip member as compared to said distal end.

12. The air hose coupler of claim 11, wherein said grip member has a stop formed between said shoulder and said proximal end, said stop configured as a widened portion of said grip member as compared to said shoulder.

13. The air hose coupler of claim 12, wherein said grip member has a length from said proximal end to said distal end of at least approximately 4 inches.

14. The air hose coupler of claim 13, wherein said body has a paw extending therefrom for engagement with a catch of a trailer coupler.

15. An air hose coupler for a tractor-trailer air brake system, the trailer having a trailer air hose and a trailer air hose coupler defining an air passage in communication with the trailer air hose, the tractor having a tractor air hose and a tractor air hose coupler defining an air passage in communication with the tractor air hose, the improvement therein comprising:

said tractor coupler including a body having a mating surface for mating with a trailer air hose coupler, said mating face defining an air orifice communicating with said first air passage for alignment with the air passage of a trailer coupler;

an elongated grip member having a proximal end rigidly mounted to said body and a distal end projecting from said body and extending approximately radially outwardly from said air orifice of said body;

a first fitting extending outwardly from said distal end of said grip member for connection to a trailer air hose;

a second air passage extending from said first fitting through said grip member to said first air passage of said body and pneumatically communicating with said first air passage of said body;

said grip member being of stepped thickness of progressively decreasing breadths from said proximal end toward said distal end for grasping by an operator during engagement of said tractor air hose coupler;

so that slipping of the hand of an operator from the distal end toward the proximal end of the grip is avoided during connecting of the tractor coupler to the trailer coupler.

* * * * *